United States Patent [19]

Cadotte

[11] 4,039,440

[45] Aug. 2, 1977

[54] REVERSE OSMOSIS MEMBRANE

[75] Inventor: John E. Cadotte, Minneapolis, Minn.

[73] Assignee: The United States of America as represented by the Secretary of the Interior, Washington, D.C.

[21] Appl. No.: 541,477

[22] Filed: Jan. 16, 1975

Related U.S. Application Data

[63] Continuation-in-part of Ser. No. 287,592, Sept. 19, 1972, abandoned.

[51] Int. Cl.$^2$ .................. B01D 31/00; B01D 13/00
[52] U.S. Cl. ........................ 210/23 H; 210/500 M; 264/41
[58] Field of Search ............ 210/23 H, 321 R, 500 M; 264/41

[56] References Cited

U.S. PATENT DOCUMENTS

| | | | |
|---|---|---|---|
| 3,276,996 | 10/1966 | Lazare | 210/500 M X |
| 3,647,086 | 3/1972 | Mizutani et al. | 204/296 X |
| 3,714,010 | 1/1973 | Suszer | 204/180 P |
| 3,723,306 | 3/1973 | Bridgeford | 210/22 |
| 3,744,642 | 7/1973 | Scala et al. | 210/500 M |
| 3,951,815 | 4/1976 | Wrasidlo | 210/500 M |

*Primary Examiner*—Frank A. Spear, Jr.
*Attorney, Agent, or Firm*—William S. Brown; Donald A. Gardiner

[57] ABSTRACT

A reverse osmosis membrane is prepared by reaction of a film or layer of polyethylenimine with a polyfunctional reagent whose functional groups are capable of reacting with amine groups. The polyfunctional reagent is preferably a water-soluble, aromatic or heterocyclic compound having acid chloride or isocyanate functional groups.

The membrane is preferably prepared in situ on a polysulfone or chlorinated polyvinyl chloride support by initial formation of a layer of polyethylenimine on the support, followed by interfacial reaction with the polyfunctional reagent to produce a thin surface coating possessing salt barrier characteristics.

5 Claims, No Drawings

REVERSE OSMOSIS MEMBRANE

This application is a continuation-in-part of application Ser. No. 287,592, filed Sept. 19, 1972, now abandoned.

Reverse osmosis has attracted considerable interest in the field of purification of saline water. In this process, a pressure in excess of the osmotic pressure of the saline water feed solution is applied to the solution separated from purified water by a semipermeable membrane. Pure water is thereby caused to diffuse through the membrane, while the salt molecules or other impurities are retained by the membrane.

Efficiency of the reverse osmosis process depends to a large extent on the nature of the membrane and numerous types of membranes, and methods of preparing them have been described in the prior art, e.g., in U.S. Pat. Nos. 3,133,132; 3,310,488; 3,344,214; 3,412,184; 3,439,074; 3,472,766; 3,497,451; 3,551,331; 3,567,632; and 3,585,125. These membranes are commonly cast from a solution comprising the membrane material and a solvent, with or without additional solution components such as water, swelling agents, etc. The membranes may be employed in the reverse osmosis process in the form of a free film or, more commonly, as a film deposited on a porous support material. These prior art membranes have, however, generally been subject to deficiencies such as compaction and chemical or biological degradation, resulting in too short of useful life, and too low flux or salt rejection, resulting in inefficient operation.

It has now been found, in accordance with the present invention, that reverse osmosis membranes having excellent flux and salt rejection properties, as well as freedom from compaction or degradation, may be prepared by interfacial reaction of a film of polyethylenimine on a porous support with a water-insoluble polyfunctional interfacial cross-linking reagent having functional groups that react with amine groups.

Polyethylenimine, hereafter referred to as PEI, is produced by polymerization of ethylenimine and has previously had a wide variety of commercial applications such as adhesives, flocculating agents, ion exchange resins, complexing agents, absorbents, etc. It is a highly branched polyamine with amino nitrogens in the ratio of primary:secondary:tertiary of about 1:2:1. It is available in a wide range of molecular weights of about 600 to 100,000, all of which are soluble in water, giving slightly hazy appearing solutions.

The molecular weight of the PEI is not a critical factor in the invention, although optimum values may vary depending on various factors such as the type of support, nature of the saline water feed, salt rejection, and flux desired, etc. Generally, a molecular weight of about 600 to 100,000 is suitable, with about 12,000 to 100,000 usually being preferred.

A film of the PEI is prepared from a solution of the polymer in water. This solution is usually most easily prepared by gradual dilution of the PEI with water until the desired concentration is obtained. Mixing is continued until a uniform hazy appearing solution is obtained and, preferably, the solution is then filtered. Optimum concentration of PEI in the aqueous solution depends on the molecular weight of the PEI. For the higher molecular weights, i.e., about 50,000 to 100,000, a concentration of 0.3 to 2 percent usually gives best results. For lower molecular weights, i.e., about 600 to 12,000, a concentration of about 2 to 6 percent is usually preferred.

The PEI film on the support may be prepared by any conventional procedure which permits interfacial reaction between the exposed surface of the PEI film and a suitable polyfunctional agent. Examples of such procedures include casting a solution of PEI on the support, dipping or immersing the support in solution, etc. (The most practical and useful solvent for the PEI is water). Generally, however, formation of the film is most conveniently and effectively prepared by simply placing the support in the PEI solution for a period of time sufficient to permit adsorption of a film of the solution onto the support. Generally, the period of contact is not critical, periods of a few seconds to 24 hours all having been found to produce good membranes.

The support may be any of the types conventionally used in reverse osmosis processes. These include porous glass, sintered metals, ceramics, and organic polymeric materials such as cellulose esters, styrene, vinyl butyral, polysulfone, chlorinated polyvinyl chloride, etc. Polysulfone film has been found to be a particularly effective support material for the membranes of the invention, and chlorinated polyvinyl chloride is another very effective support material. Preparation of polysulfone support films is described in Office of Saline Water Research and Development Progress Report No. 359, Oct., 1968. It consists essentially of casting a solution of polysulfone in dimethylformamide (DMF) on a glass plate, followed by immersing in a 2 percent aqueous DMF solution to gel the film. The side of the polysulfone film exposed to the air during casting is called the "face" and contains very small pores, mostly under 100 angstroms in diameter. The "back" of the film in contact with the glass plate has very coarse pores. The PEI coating must be applied to the face of the polysulfone support film for efficient results in reverse osmosis desalination.

The reverse osmosis membrane of the invention is then prepared by reaction of the surface of PEI film with the polyfunctional reagent to produce a thin coating possessing salt barrier characteristics. This reagent consists of a difunctional or trifunctional organic compound, i.e., a compound containing two or three functional groups capable of reacting with amine groups in the PEI. Since the purpose of the polyfunctional reagent is to provide an interfacial reaction substantially concentrated on or confined to the surface of the PEI film, the polyfunctional reagent should be selected in accordance with the principles of interfacial reactions. For example, when the PEI film is cast from an aqueous solution, the polyfunctional reagent or polyfunctional reagent solution should be substantially insoluble in water. For this and other reasons, various polyfunctional reagents compatible with non-polar organic (e.g., hydrocarbon) solvents but substantially insoluble in water are preferred. All water-insoluble, hydrocarbon-soluble polyfunctional agents do not work with equal effectiveness, and agents having isocyanate or acid chloride (e.g., carboxylic acid chloride or sulfonyl chloride or cyanuric acid chloride, i.e., cyanuric chloride) functional groups are preferred. Selection of the polyfunctional reagent is also governed by empirical considerations, e.g. the salt rejection and flux properties or resistance to compaction of the ultimately obtained combination of the support film, the PEI film, and the surface coating or barrier layer produced by the reaction at the interface between the polyfunctional reagent medium and the exposed surface of the PEI film. It is difficult to predict these flux and salt rejection properties from purely theoretical considerations, although some limited generalizations can be made based upon available data.

First, water soluble polyfunctional agents appear to produce membranes with poor salt rejection properties, e.g. less than 95% or even less than 90% salt rejection, more typically 10–60% rejection. (To meet or exceed the World Health Organization potable water standard of 500 parts per million [ppm] salt content with a practical, economical reverse osmosis process, a salt rejection capability of at least about 99.5% is preferred, and reverse osmosis membranes with a salt rejection capability less than 95% are ordinarily unsuitable for a single-pass reverse osmosis process.)

Second, monofunctional acid chloride and monoisocyanates also result in interior salt rejection properties, e.g., less than 60%.

Third, monofunctional or polyfunctional agents wherein the functional groups are chloroformates, aldehydes, or reactive methylol groups (—$CH_2OH$) have similar drawbacks.

With some exceptions, aliphatic diisocyanates are less effective interfacial cross-linking agents when compared to aromatic diisocyanates (e.g., tolylene diisocyanate). Diisocyanatohexane is an example of an aliphatic diisocyanate which provides a salt barrier with relatively good salt rejection properties. As a general rule, aromatic or heterocyclic polyfunctional agents are preferred for good salt rejection and good resistance to compaction, but, again, there are exceptions to this generalization, as in the case of trimellitic anhydride acid chloride, which has good flux properties but inferior salt rejection properties. Although the explanation for the superiority of the heterocyclic or aromatic polyfunctional acid chlorides or isocyanates is not known with certainty, it is believed that their cyclic bridging groups linking the PEI structure contribute greater stiffness to the membrane so that it exhibits better resistance to compression.

As pointed out previously, an economical reverse osmosis system (e.g., a one-pass system) generally calls for a salt rejection capability greater than 95%, more typically greater than 99.3%, e.g., at least 99.5%. Upon comparing, for example, the content of salt in sea water (35,000 ppm) and content of salt in potable water (e.g. 500 ppm), the reason for this high rejection capability becomes readily apparent.

Economical operation also requires high flux capabilites and resistance to compaction. A flux rate below 5 gallons/sq.ft./day (5 gfd) is ordinarily uneconomical unless special measures are taken to provide a membrane with unusually high surface area, e.g. by forming the membrane into bundles of hollow fibers. In the typical desalinization unit, a flux rate of at least 10 gfd is preferred, and a flux above 20 gfd is particularly well suited to commercial operation.

Superiority of the acid chloride and isocyanate functional groups, and the aromatic and heterocyclic linking groups, are illustrated in the examples below. Tolylene 2,4-diisocyanate and isophthaloyl chloride have been found to be particularly effective in reverse osmosis processes. Reaction of these compounds with the PEI produces polyurea and polyamide linkages primarily at the surface of the PEI structure. Other suitable polyfunctional reagents include terephthaloyl chloride, metabenzene disulfonyl chloride, cyanuric chloride (i.e., 2,4,6-trichloro-s-triazine, the acid chloride of cyanuric acid), and diphenylether disulfonyl chloride.

Reaction of the PEI film with the polyfunctional reagent is conveniently accomplished by immersion of the film in a solvent solution of the reagent. The solvent employed must not dissolve either the PEI or the support material. Hydrocarbon solvents such as n-hexane, heptane, octane, or cyclohexane are generally most practical. Optimum concentration of the polyfunctional reagent in the solvent may vary considerably depending on the specific reagent, solvent, support, etc., and is best determined experimentally. However, concentrations of about 0.1 to 5.0, preferably about 0.5 to 1.0 percent are generally satisfactory.

The interfacial reaction between the surface of the PEI film and the polyfunctional agent can occur at room temperature, particularly in the case of the ioscyanate/amine reaction, which results in urea linkages. Since this interfacial reaction is largely concentrated on the surface of the PEI film and does not necessarily reduce the water sensitivity of internal regions of the PEI film, it is preferred to autogenously crosslink the PEI film with heat, e.g., at a temperature of about 90°–130° C. This heat-activated cross-linking typically involves interactions between terminal or pendant amine (e.g., primary amine) groups of the PEI and liberation of ammonia. The result of the autogenous cross-linking is insolubilization of the PEI. Other methods for insolubilizing PEI film are known, but, if used in the context of this invention, these other methods should not interfere with the interfacial cross-linking reaction or the formation of a salt barrier layer on the surface of the PEI film. (The maximum salt rejection capability of insolubilized PEI film per se appears to be less than 95%, more typically less than 92%.) The PEI insolubilizing reaction conditions are selected to attain adequate insolubilization without undue sacrifice of flux properties. Inadequate insolubilization allows the PEI film to retain sufficient water sensitivity to be excessively swelled by water, causing the overall membrane composite to be less durable.

The interfacial cross-linking and insolubilization reactions can be carried out simultaneously in the solvent solution (one-step process), in which case the solvent solution is heated to the required temperature. Or, preferably, the PEI film can be removed after a short period, e.g., about 10 seconds to 10 minutes, and placed in an oven at the required temperature to carry out the insolubilization (two-step process). Optimum reaction time may also vary with the above-discussed variables, but a period of about 5 to 30 minutes is usually satisfactory.

Drying of the PEI film, to remove free water, prior to reaction with the polyfunctional reagent is necessary if the latter is readily hydrolyzed by water. Air-drying is usually satisfactory, but application of heat, as by means of radiant gas heaters or infrared lamps, may be employed to accelerate drying. However, drying can be omitted if the polyfunctional reagent has a manifold greater reactivity toward the PEI versus water or is of a type that is not readily hydrolyzed by water. For example, very good results (see examples) have been obtained by reaction of a low molecular weight PEI (molecular weight, 12,000) on a polysulfone support film with tolylene diisocyanate, without the use of a drying step. When drying a PEI-coated polysulfone support, heat is applied to the back of the polysulfone film so that water vapors escape through the coarse pores in the back of the film and, therefore, do not disturb the PEI layer on the face of the film.

Optimum results, in terms of both convenience and reverse osmosis properties of the product membranes, are usually achieved by means of in situ formation of the membrane on the support. According to this procedure, the PEI film is initially adsorbed on the support material by contacting the support with an aqueous solution of the PEI, as described above. Since PEI is a cationic polyelectrolyte that is readily adsorbed on porous materials, it is particularly suited to in situ formation of membranes on porous support materials.

The adsorbed PEI on the support is then reacted with the polyfunctional reagent, as described above, resulting in the in situ formation of the barrier membrane on the adsorbed PEI. Again, PEI is uniquely effective in its high degree of reactivity with the polyfunctional reagents, as well as the above-mentioned outstanding ability to be adsorbed. This membrane is then heated to 105°–115° C for 5–15 minutes in an oven to render the underlying PEI layer insoluble.

The membranes of the invention, resulting from the reaction of the amine groups of PEI with the polyfunctional reagents, usually range from about 1000 to 10,000 angstroms in thickness, are insoluble in water or solvents and, when formed in situ, usually cannot be mechanically removed from the support. They consist of three distinct zones of decreasing permeability: (1) the porous support film, (2) the PEI film or layer, which is sufficiently retentive to give about 50 to 90 percent salt rejection in reverse osmosis desalination of sea water and (3) the highly retentive surface zone formed by the interfacial reaction of the PEI with the TDI solution. The latter zone, which is believed to be on the order of a few molecules in thickness, is an essential element in the membrane of the invention and provides the greater than 99 percent salt rejection that is required for efficient sea water desalting. At the same time, it is thin enough to allow a practical flux.

The following examples will serve to more specifically illustrate the invention.

EXAMPLES 1–6

In these examples, the support was a polysulfone film, prepared as described above, having a thickness of 1.5 to 2.0 mils and composed of polysulfone of a molecular weight of 20,000 to 40,000.

A PEI coating was applied to the face of the polysulfone film by means of the following steps:

1. A 2 percent solution of PEI of molecular weight 12,000 was prepared by gradual dilution of the PEI with water until the desired concentration was obtained. Mixing was continued until a uniform hazy appearing solution was obtained and the solution was filtered.
2. The polysulfone support film, while still wet, was laid face down on the surface of the PEI solution for a period of 1 minute.
3. The support film was lifted off the PEI solution and clamped in a vertical position to air-dry for a period of 10 minutes in order to reduce the water content to about 0.2 percent. The thickness of the resulting PEI coating on the face of the support film was 6000 angstroms.

The PEI-coated polysulfone support film was then immersed in a solution of the polyfunctional reagent in n-heptane, with the solution maintained at a temperature of 90° C. The reaction was continued for a period of 10 minutes, after which the resulting membrane-support composite was removed from the reaction medium, washed with heptane, and dried at 25° C for a period of 30 minutes.

It was then tested in a reverse osmosis test cell under the following test conditions:
Pressure: 1500 psig
Flow rate: 1 liter per minute
Feed: 3.5 percent NaCl
Temperature: 25° C
Length of test: 20–24 hours.

PEI concentrations, polyfunctional reagents used, and concentrations of the polyfunctional reagent are given in Table 1. Results, i.e., flux and salt rejection, are also given in the table.

Table 1

| Ex. | Polyfunctional reagent* | PEI concentration, wt % | Polyfunctional reagent concentration, wt % | Flux, gfd | Rejection, % |
|---|---|---|---|---|---|
| 1 | TDI | 0.33 | 1.0 | 6.2 | 99.8 |
| 2 | TDI | 1.0 | 1.0 | 5.7 | 99.82 |
| 3 | TDI | 1.0 | 0.1 | 16.3 | 99.8 |
| 4 | TPC | 0.33 | 1.0 | 7.8 | 97.0 |
| 5 | DPESC | 0.33 | 1.0 | 5.3 | 99.2 |
| 6 | CC | 1.0 | 1.0 | 10.8 | 99.1 |

*TPC terephthaloyl chloride
TDI tolylene 2,4-diisocyanate
CC cyanuric chloride
DPESC diphenyl ether disulfonyl chloride.

EXAMPLES 7–11

In these examples, reaction with the polyfunctional reagent (TDI) was carried out without previous drying of the support. The support was the polysulfone film employed in Examples 1–6.

The support film was contacted with a 2 percent aqueous solution of PEI of molecular weight 12,000. The film was removed and held in a vertical position to allow excess PEI solution to drain for a period of about 1 minute. The wet film was laid in a flat tray and covered with a solution of TDI in hexane at room temperature for a period of about 3 minutes.

The film was then removed, drained, and cured in an oven for ten minutes at a temperature of about 115° C.

It was then tested in a reverse osmosis test cell under the following conditions:
Pressure: 1500 psig
Flow rate: 1.5 liters per minute
Feed: 3.5 percent NaCl
Temperature: 25° C
Length of test: 20–24 hours.

TDI Concentrations and results are given in Table 2.

Table 2

| Example | TDI concentration, % | Flux, gfd | Rejection, % |
|---|---|---|---|
| 7 | 0.01 | 44.1 | 84.50 |
| 8 | 0.1 | 23.7 | 98.51 |
| 9 | 0.5 | 17.2 | 99.46 |
| 10 | 1.0 | 8.1 | 99.80 |
| 11 | 2.0 | 4.3 | 99.89 |

Additional reverse osmosis tests with various membranes prepared according to the process of the invention have shown no flux decline in 200 hours of operation, thus indicating a high degree of compressive resistance.

EXAMPLES 12–14

In these examples, the procedure was essentially the same as that of examples 7–11, except that isophthaloyl chloride (IPC) was used as the polyfunctional reagent, with concentrations of the IPC in the hexane solvent being either 0.5 or 1.0 wt. percent as shown in Table 3. Immersion time of the wet PEI film (on polysulfone support) in the IPC solution, as well as reverse osmosis test results, are also given in Table 3.

Table 3

| Example | IPC concentration, % | Immersion time, minutes | Flux, gfd | Salt rejection, % |
|---|---|---|---|---|
| 12 | 0.5 | 1 | 40.3 | 99.15 |
| 13 | 1.0 | 1 | 28.2 | 99.45 |
| 14 | 0.5 | 5 | 30.7 | 99.54 |

EXAMPLES 15-24

These examples illustrate the criticallity of the use of the polyfunctional reagents of the invention in preparation of efficient reverse osmosis membranes. Membranes were prepared and tested using a procedure essentially the same as that of examples 7-11, except that a series of conventional crosslinking reagents were employed in place of the polyfunctional reagents of the invention. The crosslinking reagents of these examples were all characterized by the lack of one or more of the essential characteristics of the polyfunctional reagents of the invention, i.e., that the reagents be aromatic or heterocyclic, that they be polyfunctional and that the functional groups be acid chloride or isocyanate.

Concentration of the crosslinking agent in hexane solvent and reverse osmosis test results are all given in Table 4. In every case the reaction with the crosslinking reagent was carried out at 23° C. for at least 5 minutes. It is apparent that the resulting membranes all exhibited poor reverse osmosis properties, i.e., salt rejection or flux, or both, were very low. This is in contrast to the outstanding reverse osmosis properties of the membranes of the invention, as shown in the examples above.

Table 4

| Example | Reagent | Flux, gfd | Rejection, % |
|---|---|---|---|
| | Monofunctional Reagents | | |
| 15 | 1% Benzoyl chloride | 57.7 | 19.1 |
| 16 | 1% Toluene sulfonyl chloride | 84.8 | 12.6 |
| 17 | 1% Dimethylaminobenzaldehyde | 88 | 29.6 |
| | Miscellaneous Difunctional Reagents | | |
| 18 | 1% Divinylsulfone | 6.5 | 66.2 |
| 19 | Phosgene | 65.7 | 28.2 |
| 20 | 1% Diethylene glycol bischloroformate | 9.5 | 93.0 |
| | Aliphatic Acid Chlorides | | |
| 21 | 1% Oxalyl chloride | 123 | 17.8 |
| 22 | 1% Sebacyl chloride | 47.1 | 41.0 |

Data for the two exceptions to the general rules mentioned previously are given below. It will be noted that the salt rejection determination for trimellitic anhydride was low when compared to the data for TPC, CC, DPESC, and IPC (Examples 4-6 and 12-14), while that for diisocyanatohexane was roughly intermediate between the salt rejection data for Examples 8 and 9 (0.1% and 0.5% TDI, respectively). Flux data for diisocyanatohexane are rather low, however.

Table 5

| Example | Reagent | Flux, gfd | Rejection, Percent |
|---|---|---|---|
| 23 | 1% Trimellitic anhydride acid chloride | 22.3 | 80 |
| 24 | 1% Diisocyanatohexane | 2.3 | 99.26 |

EXAMPLES 25-31

The purpose of these examples was to illustrate the importance of interfacial crosslinking.

In these examples, crosslinking agents were dissolved in the PEI solution so that the crosslinking reactions could take place in a substantially homogeneous medium. The PEI used for these experiments was "Tydex" 12. The crosslinking agents were dissolved in 100 g. of 0.67% "Tydex" 12 solution. The resulting solution was then coated on polysulfone support film, and the coated product was oven cured for 10 minutes at 130° C. A control sample was made by omitting the crosslinking agent but using the same curing conditions. The control was thus crosslinked with heat alone.

Reverse osmosis test results are given in the following table:

Table 6

| Example | Crosslinking Agent and Amount thereof | Flux, gfd | Salt rejection, percent |
|---|---|---|---|
| Control | None | 64.2 | 77.8 |
| 25 | Formaldehyde, 3 g. of 37% | 75.1 | 71.7 |
| 26 | Glyoxal, 3 g. of 40% | 174 | 15.5 |
| 27 | Glutaraldehyde, 3 g. of 50% | 38.2 | 74.5 |
| 28 | Trimethylolmelamine, 10 g. of 10% | 60.2 | 78.3 |
| 29 | Trimethylolphenol, 10 g. of 10% | 115 | 39.8 |
| 30 | Epichlorohydrin, 1 g. | 40.8 | 88.0 |
| 31 | Divinylsulfone, 1 g. | 10.4 | 93.6 |

It will be noted that the performance of the control was not significantly improved upon by substantially homogeneous chemical crosslinking reactions except in the case of epichlorohydrin and divinylsulfone; in any event, the best salt rejection capability obtained was less than 95%. These results further underscore the desirability of interfacial crosslinking as a means for obtaining an extremely thin but highly retentive salt barrier on the surface of the PEI film.

EXAMPLE 32

Membranes were prepared by the procedure used in Example 10 except that chlorinated polyvinyl chloride support film was used. The support film was prepared using a 15 weight percent solution of chlorinated polyvinyl chloride (B. F. Goodrich "Geon" 603×560) in dimethylformamide (DMF). The solution was spread on a glass plate usng a 7-mil film applicator and the plate was immersed in water to gel the chlorinated polyvinyl chloride film and extract the DMF. The support film was coated with PEI and reacted with 0.5 percent TDI in hexane as described in Examples 7 through 11. The membranes formed exhibited 10.6 to 12.3 gfd flux at 98.0 to 98.2 percent salt rejection under the test conditions outlined in Examples 1 through 6.

I claim:

1. A process for the preparation of a reverse osmosis membrane consisting of the steps of (1) coating a porous support with a film of polyethyleneimine; (2) contacting the product of step (1) with a solution of a polyfunctional cross-linking reagent in a non-polar organic solvent, said cross-linking reagent consisting of isophthaloyl chloride; and (3) heat curing the product of step (2) at a temperature of about 90° to 130° C for a period of about 5 to 30 minutes.

2. The process of claim 1 in which said porous support comprises polysulfone.

3. The process of claim 1 in which said porous support comprises chlorinated polyvinyl chloride.

4. A reverse osmosis membrane prepared by the process of claim 1.

5. In a process for desalination of saline water by reverse osmosis comprising contacting the saline water under pressure with a reverse osmosis membrane, the improvement comprising using the membrane of claim 4 as the reverse osmosis membrane.

* * * * *